(12) United States Patent
Chang et al.

(10) Patent No.: US 9,357,190 B2
(45) Date of Patent: *May 31, 2016

(54) PROJECTION DEVICE AND AUTOMATIC PROJECTION CALIBRATION METHOD THEREOF

(71) Applicant: Coretronic Corporation, Hsin-Chu (TW)

(72) Inventors: Kun-Rong Chang, Hsin-Chu (TW); Wen-Wei Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 172 days.

This patent is subject to a terminal disclaimer.

(21) Appl. No.: 14/210,455

(22) Filed: Mar. 14, 2014

(65) Prior Publication Data

US 2014/0307102 A1    Oct. 16, 2014

(30) Foreign Application Priority Data

Apr. 10, 2013    (CN) .......................... 2013 1 0122681

(51) Int. Cl.
*H04N 9/31* (2006.01)
*G03B 21/14* (2006.01)

(52) U.S. Cl.
CPC ............ *H04N 9/3191* (2013.01); *G03B 21/147* (2013.01); *H04N 9/3185* (2013.01); *H04N 9/3194* (2013.01)

(58) Field of Classification Search
CPC . H04N 9/3182; H04N 9/3185; H04N 9/3194; H04N 9/3197; G03B 21/14; G03B 21/147; G03B 21/2033

USPC ................................................ 353/31, 69, 70
See application file for complete search history.

(56) References Cited

U.S. PATENT DOCUMENTS

| | | | | |
|---|---|---|---|---|
| 7,517,089 | B2* | 4/2009 | Matsuda .................. | H04N 5/74 345/694 |
| 2008/0204670 | A1* | 8/2008 | Furui ...................... | G03B 21/14 353/69 |
| 2011/0001881 | A1* | 1/2011 | Kawahara ............ | H04N 9/3182 348/649 |
| 2011/0007283 | A1 | 1/2011 | Tanaka | |
| 2011/0019004 | A1 | 1/2011 | Ohmori et al. | |
| 2012/0287298 | A1* | 11/2012 | Kitashou .............. | H04N 9/3185 348/222.1 |

* cited by examiner

*Primary Examiner* — Sultan Chowdhury
(74) *Attorney, Agent, or Firm* — Jianq Chyun IP Office

(57) ABSTRACT

A projection device and an automatic projection calibration method thereof are disclosed. When the projection device boots up, an image pattern corresponding to a display data is projected through a projecting unit. The image pattern is sensed through an image sensor to obtain information of the image pattern. The information of the image pattern is compared with information of a previous image pattern through a processing unit to determine whether to execute an automatic calibration procedure. When the processing unit executes the automatic calibration procedure, a calibration pattern is projected through the projecting unit. The calibration pattern is sensed through the image sensor to obtain information of the calibration pattern. A calibration driving procedure is executed through the processing unit to convert imaging coordinates of the calibration pattern sensed through the image sensor into projecting coordinates of the projection device, so as to establish a coordinate conversion table.

20 Claims, 3 Drawing Sheets

PROJECTION DEVICE AND AUTOMATIC PROJECTION CALIBRATION METHOD THEREOF

CROSS-REFERENCE TO RELATED APPLICATION

This application claims the priority benefit of China application serial no. 201310122681.4, filed on Apr. 10, 2013. The entirety of the above-mentioned patent application is hereby incorporated by reference herein and made a part of this specification.

BACKGROUND OF THE INVENTION

1. Field of the Invention

The invention generally relates to an image device and a calibration method thereof, and more particularly, to a projection device and an automatic projection calibration method thereof.

2. Description of Related Art

Along with the development of technologies, infrared interactive projection systems have been increasingly applied, for example, on whiteboards and electronic entertainment devices (for example, Wii). Generally, to calibrate between a projection device and a photographic device in an infrared interactive projection system, a user touches some specific areas on the projection screen by using an infrared stylus, so that the infrared interactive projection system would calculate the image dimension and resolution of the current projection according to the touch operations of the infrared stylus on aforementioned specific areas and adjust the detection performed by the photographic device on the touched positions. However, because such calibration operation is manually carried out, inaccurate touch operations performed by the user on the specific areas will cause errors in the calculation of the image dimension and resolution of the current projection performed by the infrared interactive projection system. As a result, incorrect calibration result will be produced.

The U.S. Patent publication No. 20110007283 discloses a projector. The projector includes an image unit, an image generating unit, a position information generating unit, and a projecting unit. The image unit captures light having a first wavelength band in a projection target area and generates a first image, and captures light having a second wavelength band in the projection target area and generates a second image. The image generating unit performs a keystone distortion correction according to the first image. The position information generating unit generates a position information which indicates the position of an indicator light beam in the projection target area according to the second image. The projecting unit projects an image according to the position information in the keystone distortion corrected state. The U.S. Patent publication No. 20110019004 discloses an image device. The image device includes an image element, a color filter, a read control unit, an infrared component number detecting unit, and an infrared component removing unit. The image element includes a plurality of pixels on a receiving surface. The color filter includes a plurality of red, green, and blue filter units.

SUMMARY OF THE INVENTION

Accordingly, the invention is directed to a projection device and an automatic projection calibration method thereof, wherein whether to calibrate interactive coordinates of a user operation when the projection device boots up is determined, so that operating the projection device is made more convenient.

Additional aspects and/or advantages of the invention will be set forth in part in the description which follows and, in part, will be obvious from the description, or may be learned by practice of the invention.

To achieve the above-mentioned or other objectives, an embodiment of the invention provides a projection device. The projection device includes a projecting unit, an image sensor, a processing unit, and a storage unit. The projecting unit receives a projection control signal and a display data and projects a calibration pattern or an image pattern according to the projection control signal. The image pattern is corresponding to the display data. The processing unit is coupled to the projecting unit and the image sensor and provides the projection control signal. When the projection device boots up, the processing unit controls the projecting unit to project the image pattern through the projection control signal and senses the image pattern through the image sensor, so as to obtain information of the image pattern. The processing unit compares the information of the image pattern with information of a previous image pattern to determine whether to execute an automatic calibration procedure. When the processing unit executes the automatic calibration procedure, the processing unit controls the projecting unit to project the calibration pattern through the projection control signal and senses the calibration pattern through the image sensor, so as to obtain information of the calibration pattern. Besides, the processing unit converts imaging coordinates of the calibration pattern sensed by the image sensor into projecting coordinates of the projection device through executing a calibration driving procedure, so as to establish a coordinate conversion table. The storage unit stores the information of the previous image pattern, the calibration driving procedure, and the coordinate conversion table.

To achieve the above-mentioned or other objectives, an embodiment of the invention also provides an automatic projection calibration method of a projection device. The automatic projection calibration method includes following steps. When the projection device boots up, an image pattern corresponding to a display data is projected through a projecting unit. The image pattern is sensed through an image sensor to obtain information of the image pattern. The information of the image pattern is compared with information of a previous image pattern through a processing unit to determine whether to execute an automatic calibration procedure. When the processing unit executes the automatic calibration procedure, a calibration pattern is projected through the projecting unit. The calibration pattern is sensed through the image sensor to obtain information of the calibration pattern. A calibration driving procedure is executed through the processing unit to convert imaging coordinates of the calibration pattern sensed by the image sensor into projecting coordinates of the projection device, so as to establish a coordinate conversion table.

As described above, embodiments of the invention provide a projection device and an automatic projection calibration method thereof, and whether to calibrate interactive coordinates of a user operation may be determined when the projection device boots up, so that operating the projection device is made more convenient.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
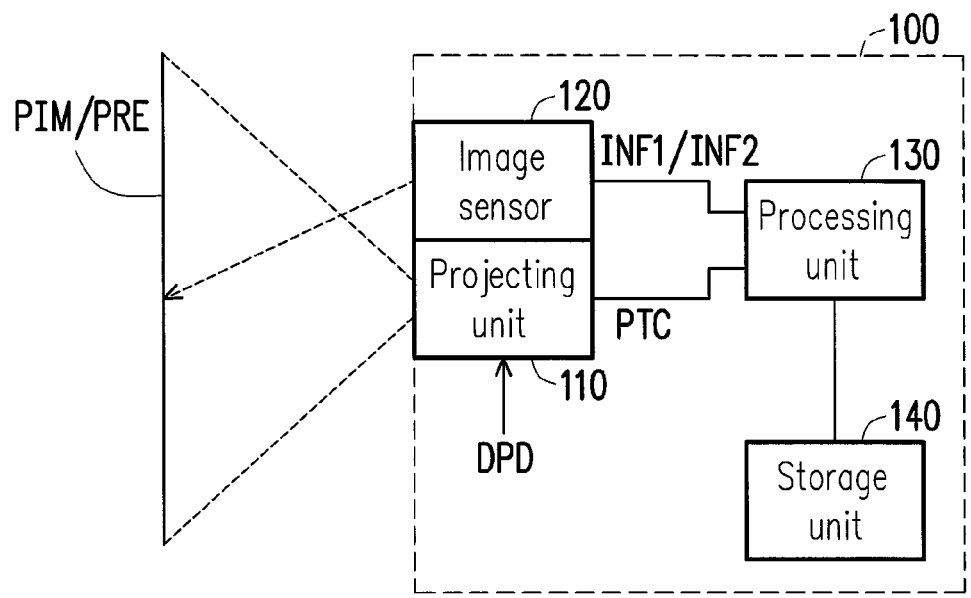
FIG. 1 is a schematic block diagram of a projection device according to an embodiment of the invention.

Referring to FIG. 1, in the embodiment, the projection device 100 includes a projecting unit 110, an image sensor 120, a processing unit 130, and a storage unit 140. The projection device 100 may be a pico projector with an infrared interactive system, a digital light processing (DLP) projector, or any other electronic device with a projection function. However, the type of the projection device 100 is not limited in the invention. The projecting unit 110 receives a projection control signal PTC and a display data DPD and projects a calibration pattern PRE or an image pattern PIM corresponding to the display data DPD according to the projection control signal PTC. The storage unit 140 stores information of a previous image pattern PIM' and a calibration driving procedure. The processing unit 130 is coupled to the projecting unit 110, the image sensor 120, and the storage unit 140 and provides the projection control signal PTC.

When the projection device 100 boots up, the processing unit 130 controls the projecting unit 110 to project the image pattern PIM through the projection control signal PTC and senses the image pattern PIM through the image sensor 120 to obtain an information INF1 of the image pattern PIM. The processing unit 130 compares the information INF1 of the image pattern PIM with the information INF1' of the previous image pattern PIM' to determine whether to execute an automatic calibration procedure. The information INF1 of the image pattern PIM and the information INF1' of the previous image pattern PIM' respectively include a pattern dimension and a plurality of boundary coordinate positions. In other words, when the information INF1 of the image pattern PIM is different from the information INF1' of the previous image pattern PIM' (i.e., the image pattern PIM is different from the previous image pattern PIM'), the processing unit 130 executes the automatic calibration procedure to adjust parameters (for example, infrared projecting coordinates) for user's operating the projection device 100. Contrarily, when the information INF1 of the image pattern PIM is the same as the information INF1' of the previous image pattern PIM' (i.e., the image pattern PIM is the same as the previous image pattern PIM'), the parameters for user's operating the projection device 100 need not be adjusted, accordingly the processing unit 130 does not execute the automatic calibration procedure. Thus, the user may operate the projection device 100 more conveniently.

When the processing unit 130 executes the automatic calibration procedure, the processing unit 130 controls the projecting unit 110 to project the calibration pattern PRE through the projection control signal PTC and senses the calibration pattern PRE through the image sensor 120 to obtain an information INF2 of the calibration pattern PRE. Besides, the processing unit 130 converts the imaging coordinates of the calibration pattern PRE sensed by the image sensor 120 into the projecting coordinates of the projection device 100 through executing a calibration driving procedure stored in the storage unit 140, so as to establish a coordinate conversion table and the coordinate conversion table is stored in the storage unit 140. In other words, by comparing the calibration pattern PRE imaged in the image sensor 120 with known projection information of the projection device 100, a one-to-one coordinate conversion relationship may be established between the imaging coordinates of the image sensor 120 and the projecting coordinates of the projection device 100, and a coordinate conversion table for converting the imaging coordinates of the image sensor 120 into the projecting coordinates of the projection device 100 may be further established accordingly.

Additionally, the image sensor 120 may detect (i.e., capture) a touch operation on the surface of an object (for example, a screen, a wall, a floor, or a whiteboard) and sends the touch operation to the processing unit 130 to perform a corresponding operation. In an embodiment of the invention, the display data DPD is provided by the processing unit 130. Thus, when the corresponding operation is related to the projected image pattern PIM (for example, a window is dragged or a picture is drawn), the display data DPD may be adjusted through the processing unit 130 to control the image pattern PIM projected by the projecting unit 110 on the surface of the object.

When the projection device 100 is configured, because the projected image (for example, the image pattern PIM or the calibration pattern PRE) may be different from the previous projected image used last time, the image projected by the projection device 100 and the interactive coordinates of the user operation may need to be calibrated, so that the image sensor 120 may detect the touch position (for example, the touch position of the touch operation) accurately and the operation desired by the user may be correctly executed when the image sensor 120 captures the touch operation. During the calibration procedure, the projecting unit 110 projects the calibration pattern PRE onto the surface of an object (for example, a whiteboard) in response to the projection control signal PTC.

Then, the image sensor 120 may sense and analyze the calibration pattern PRE to obtain information about the image currently projected by the projection device 100 (for example, the actual dimensions and resolution of the calibration pattern PRE). Next, through known projection information of the projection device 100 (for example, the resolution and dimensions of a projected image preset in the projection device 100), the processing unit 130 may automatically calibrate the image projected by the projection device 100 and the interactive coordinates of the user operation through an image processing method. After the operation calibration of the interactive coordinates is finished, when the image sensor 120 detects a touch operation on the surface of the object, the processing unit 130 may convert the touch position of the touch operation on the surface of the object into projecting coordinates of the projection device 100 and performs a corresponding operation.

In embodiments of the invention, the image sensor 120 may be a charge coupled device (CCD) or a complementary metal-oxide-semiconductor (CMOS). However, the invention is not limited thereto. Furthermore, the storage unit 140 may be a flash memory, a random access memory (RAM), a static random access memory (SRAM), or a dynamic random access memory (DRAM). However, the invention is not limited thereto. The processing unit 130 may be a central processing unit (CPU) or any other programmable microprocessor.

Figure 2:
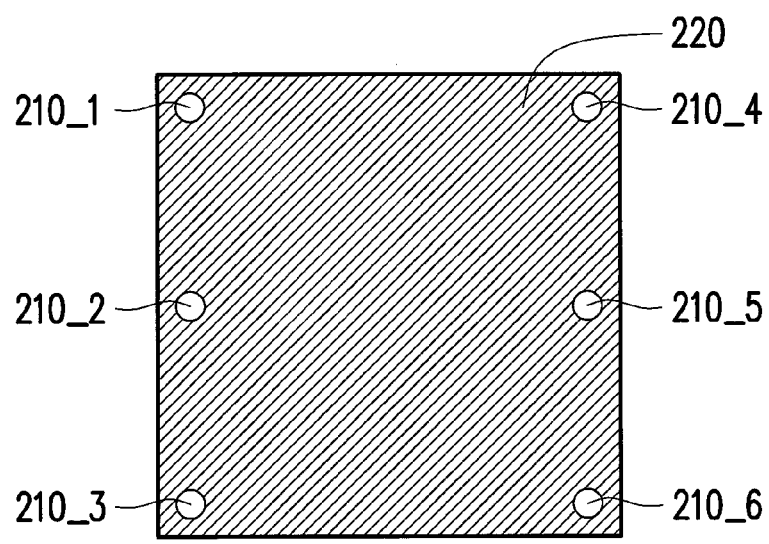
FIG. 2 is a diagram of a calibration pattern according to an embodiment of the invention.

Referring to FIG. 1 and FIG. 2, in the embodiment, the calibration pattern PRE includes characteristic regions 210_1-210_6 and 220. However, the invention is not limited thereto. The characteristic regions 210_1-210_6 may be in white color, and the characteristic region 220 may be in black color. When the projecting unit 110 projects the calibration pattern PRE onto the surface of an object (for example, a whiteboard), the image sensor 120 may capture the calibration pattern PRE, and the processing unit 130 may automatically analyze the calibration pattern PRE according to the dimensions of the characteristic regions 210_1-210_6 and 220 and the positions thereof corresponding to the calibration pattern PRE and obtain projection information about the calibration pattern PRE through calculating. The projection information may be the actual dimensions and resolution of the calibration pattern PRE.

Therefore, though capturing and analyzing the calibration pattern PRE by the image sensor 120, the image sensor 120 may automatically calibrate the image projected by the projection device 100 and the interactive coordinates of the user operation through the projection information of the obtained calibration pattern PRE thereof. Since no manual operation is needed, any calibration error caused by manual calibration operations is further decreased. The calibration pattern PRE in the embodiment is only an example, and the dimensions and position of each characteristic region and the number of the characteristic regions 210_1-210_6 and 220 may be determined by a user or according to the design requirement of persons skilled in the art. Additionally, when the calibration pattern is set up, the characteristic regions thereof have to be in at least two different colors (for example, black and white), so that when the image sensor 120 analyzes the positions and dimensions of the characteristic regions, the image sensor 120 may distinguish adjacent characteristic regions (for example, the characteristic region 210_1 and the characteristic region 220) in different colors and carry out subsequent analysis operations.

Figure 3:
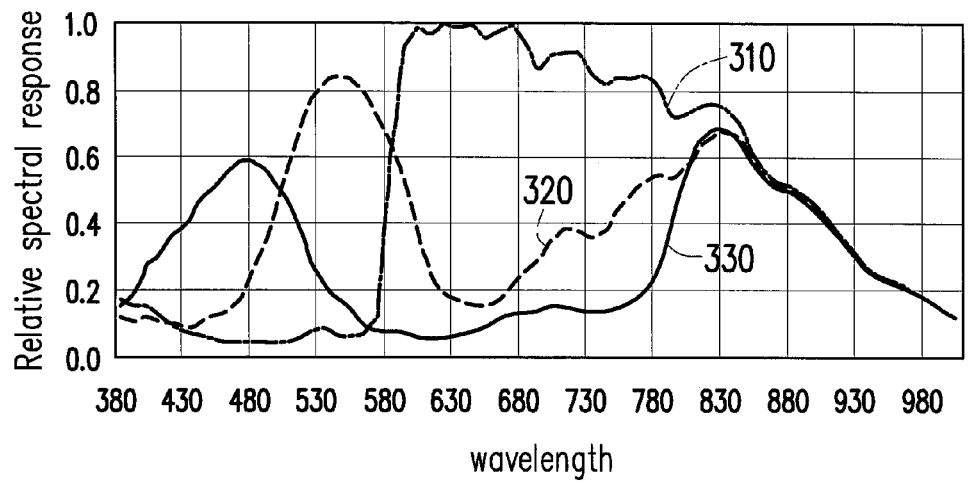
FIG. 3 is a diagram illustrating relative spectral responses of an image sensor according to an embodiment of the invention.

Referring to FIG. 1 to FIG. 3, generally, the image sensor 120 includes a plurality of red photosensitive pixels, a plurality of green photosensitive pixels, and a plurality of blue photosensitive pixels. The curve 310 is the spectral response of the red photosensitive pixels, the curve 320 is the spectral response of the green photosensitive pixels, and the curve 330 is the spectral response of the blue photosensitive pixels. As shown in FIG. 3, red light is more sensible than green light, blue light, and infrared light. Thus, while interactive coordinates are calibrated, the value sensed by the red photosensitive pixels may be used as a reference value of visible light. The blue photosensitive pixels have higher sensibility to infrared light than to blue light. Thus, while interactive coordinates are calibrated, the value sensed by the blue photosensitive pixels may be used as a reference value of invisible light.

As described above, the characteristic regions 210_1-210_6 and 220 of the calibration pattern PRE may be respectively in black and red color, and the processing unit 130 may sense the calibration pattern PRE through the image sensor 120 to obtain information INF2 of the calibration pattern PRE.

Figure 4:
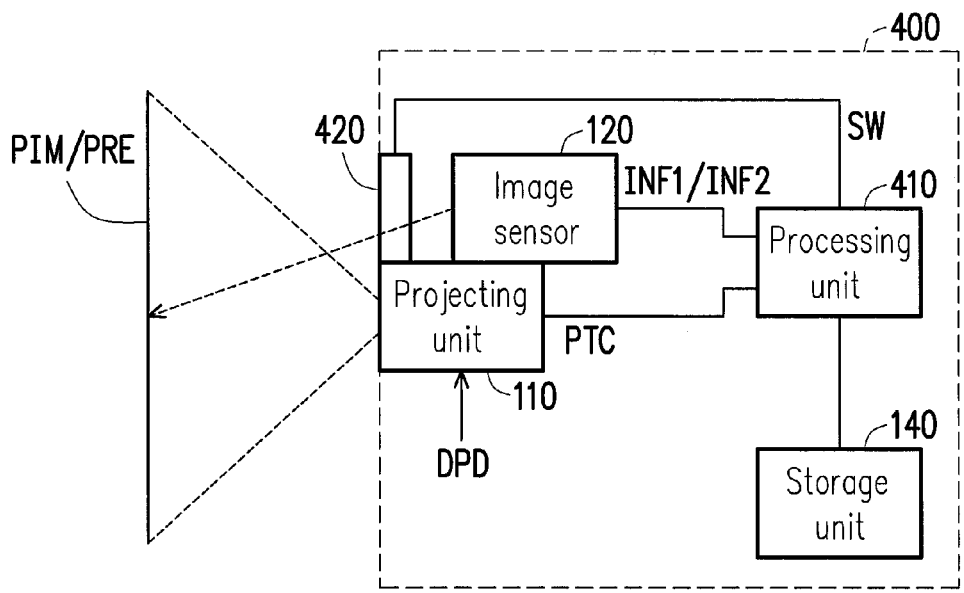
FIG. 4 is a schematic block diagram of a projection device according to another embodiment of the invention.

Referring to FIG. 4, the projection device 400 in the embodiment is similar to the projection device 100, and the differences between the projection device 400 and the projection device 100 are the processing unit 410 and the optical filtering element 420.

When the projection device 400 is in an interactive operation state, the image sensor 120 detects a touch operation. Generally, the touch operation is performed by using an infrared stylus; and to be able to detect an infrared signal emitted by the infrared stylus, the processing unit 410 may send a switch signal SW to control the optical filtering element 420 to adjust the wavelength range of the light receivable to the image sensor 120. The optical filtering element 420 may be a filter for filtering out the visible light, for example, and allowing only invisible light such as infrared light, for example, to pass through; or the optical filtering element 420 may also be a filter for filtering out blue light in visible light. Thus, when the optical filtering element 420 is disposed on the light transmission path of the image sensor 120 for sensing the image pattern PIM, the optical filtering element 420 may adjust the wavelength range of the light receivable to the image sensor 120 from a visible light range into an invisible light range (for example, the infrared wavelength range) or filter out the blue light wavelength range of the wavelength range of the light receivable to the image sensor 120.

Thus, through calibrating the image projected by the projection device 400 and the interactive coordinates of a user operation and the operation of converting a touch position into coordinate position on the projection device 400 in the processing unit 410, the processing unit 410 may automatically convert the position of a touch operation detected by the image sensor 120 (or the blue photosensitive pixels of the image sensor 120) into a coordinate position on the projection device 400, so as to control the working state of the projection device 400 or the image content projected by the projection device 400.

Figure 5:
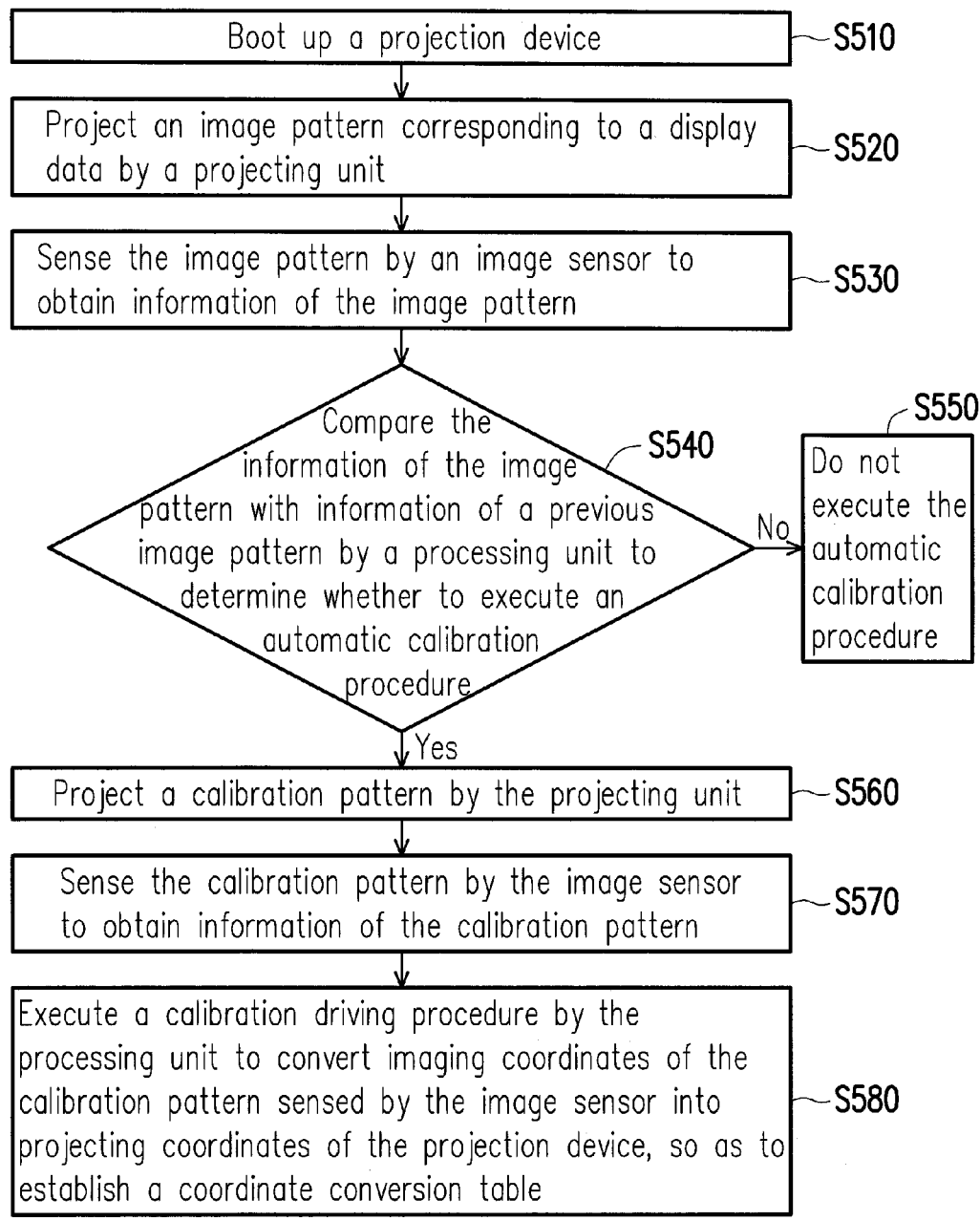
FIG. 5 is a flowchart of an automatic projection calibration method of a projection device according to an embodiment of the invention.

Referring to FIG. 5, when the projection device boots up (step S510), an image pattern corresponding to a display data is projected by a projecting unit (step S520), and the image pattern is sensed by an image sensor, so as to obtain information of the image pattern (step S530). Then, the information of the image pattern is compared with information of a previous image pattern by a processing unit to determine whether to execute an automatic calibration procedure (step S540).

When the information of the image pattern is the same as the information of the previous image pattern, the processing unit does not execute the automatic calibration procedure (step S550), i.e., the determined result of the step is "No". When the information of the image pattern is different from the information of the previous image pattern, the processing unit executes the automatic calibration procedure, i.e., the determined result of the step is "Yes". Next, a calibration pattern is projected by the projecting unit (step S560). Besides, the calibration pattern is sensed by the image sensor to obtain information of the calibration pattern (step S570). Also, a calibration driving procedure is executed by the processing unit to convert imaging coordinates of the calibration pattern sensed by the image sensor into projecting coordinates of the projection device, so as to establish a coordinate conversion table (step S580). The sequence of steps S510, S520, S530, S540, S550, S560, S570, and S580 described above is only an example but not intended to limit the scope of the invention. Moreover, details of foregoing steps S510, S520, S530, S540, S550, S560, S570, and S580 may be referred to the embodiments illustrated in FIG. 1, FIG. 2, FIG. 3, and FIG. 4 and will not be described herein.

In an embodiment of the invention, when the calibration pattern is sensed through the image sensor, the wavelength range of light receivable to the image sensor may be adjusted from a visible light range into an invisible light range (for example, the infrared wavelength range) or the blue light wavelength range may be filtered out from the wavelength range of light receivable to the image sensor through an optical filtering element according to a switch signal.

As described above, embodiments of the invention provide a projection device and an automatic projection calibration method thereof, and whether to calibrate interactive coordinates of a user operation may be determined when the projection device boots up, so that operating the projection device is made more convenient. Additionally, the projection device may automatically calibrate the interactive coordinates of user operations, so as to maintain the accuracy of the user operations.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims. Furthermore, these claims may refer to use "first", "second", etc. following with noun or element. Such terms should be understood as a nomenclature and should not be construed as giving the limitation on the number of the elements modified by such nomenclature unless specific number has been given.

What is claimed is:

1. A projection device, comprising:
   a projecting unit, receiving a projection control signal and a display data, and projecting a calibration pattern or an image pattern according to the projection control signal, wherein the image pattern is corresponding to the display data;
   an image sensor, sensing the image pattern;
   a processing unit, coupled to the projecting unit and the image sensor, and providing the projection control signal, wherein when the projection device boots up, the processing unit controls the projecting unit to project the image pattern through the projection control signal and senses the image pattern through the image sensor, so as to obtain an information of the image pattern, the processing unit compares the information of the image pattern with an information of a previous image pattern to determine whether to execute an automatic calibration procedure, when the processing unit executes the automatic calibration procedure, the processing unit controls the projecting unit to project the calibration pattern through the projection control signal and senses the calibration pattern through the image sensor, so as to obtain an information of the calibration pattern, and the processing unit converts imaging coordinates of the calibration pattern sensed by the image sensor into projecting coordinates of the projection device through executing a calibration driving procedure, so as to establish a coordinate conversion table; and
   a storage unit, storing the information of the previous image pattern, the calibration driving procedure, and the coordinate conversion table.

2. The projection device according to claim 1, wherein the information of the image pattern and the information of the previous image pattern respectively comprise a pattern dimension and a plurality of boundary coordinate positions.

3. The projection device according to claim 1, wherein when the information of the image pattern is different from the information of the previous image pattern, the processing unit executes the automatic calibration procedure, and when the information of the image pattern is the same as the information of the previous image pattern, the processing unit does not execute the automatic calibration procedure.

4. The projection device according to claim 1, further comprising:
   a first optical filtering element, adjusting a wavelength range of light receivable to the image sensor from a visible light range into an invisible light range according to a switch signal.

5. The projection device according to claim 4, wherein the invisible light range is an infrared wavelength range.

6. The projection device according to claim 1, wherein the image sensor comprises a plurality of red photosensitive pixels, a plurality of green photosensitive pixels, and a plurality of blue photosensitive pixels, and the processing unit senses a visible light range through the red photosensitive pixels and senses an invisible light range through the blue photosensitive pixels.

7. The projection device according to claim 6, further comprising:
a second optical filtering element, filtering out a blue light wavelength range from a wavelength range of light receivable to the image sensor according to a switch signal.

8. The projection device according to claim 1, wherein the calibration pattern comprises a plurality of characteristic regions.

9. The projection device according to claim 8, wherein the characteristic regions have at least two colors.

10. The projection device according to claim 9, wherein the colors comprise black color and white color.

11. The projection device according to claim 9, wherein the colors comprise black color and red color.

12. An automatic projection calibration method of a projection device, comprising:
when the projection device boots up, projecting an image pattern corresponding to a display data through a projecting unit;
sensing the image pattern through an image sensor to obtain an information of the image pattern;
comparing the information of the image pattern with an information of a previous image pattern through a processing unit to determine whether to execute an automatic calibration procedure;
when the processing unit executes the automatic calibration procedure, projecting a calibration pattern through the projecting unit;
sensing the calibration pattern through the image sensor to obtain an information of the calibration pattern; and
executing a calibration driving procedure through the processing unit to convert imaging coordinates of the calibration pattern sensed by the image sensor into projecting coordinates of the projection device, so as to establish a coordinate conversion table.

13. The automatic projection calibration method according to claim 12, further comprising:
adjusting a wavelength range of light receivable to the image sensor from a visible light range into an invisible light range according to a switch signal.

14. The automatic projection calibration method according to claim 13, wherein the invisible light range is an infrared wavelength range.

15. The automatic projection calibration method according to claim 12, further comprising:
sensing a visible light range through a plurality of red photosensitive pixels of the image sensor; and
sensing an invisible light range through a plurality of blue photosensitive pixels of the image sensor.

16. The automatic projection calibration method according to claim 15, further comprising:
filtering out a blue light wavelength range from a wavelength range of light receivable to the image sensor according to a switch signal.

17. The automatic projection calibration method according to claim 12, wherein the calibration pattern comprises a plurality of characteristic regions.

18. The automatic projection calibration method according to claim 17, wherein the characteristic regions have at least two colors.

19. The automatic projection calibration method according to claim 18, wherein the colors comprise black color and white color.

20. The automatic projection calibration method according to claim 18, wherein the colors comprise black color and red color.

* * * * *